United States Patent [19]

Schenach

[11] Patent Number: 5,447,642
[45] Date of Patent: Sep. 5, 1995

[54] METALWORKING FLUID RECYCLING PROCESS WITH PASTEURIZATION BY DIRECT STEAM INJECTION

[76] Inventor: Thomas A. Schenach, 6531 Meath Cir., Huntington Beach, Calif. 92647

[21] Appl. No.: 353,665

[22] Filed: Dec. 12, 1994

[51] Int. Cl.⁶ .................. B01D 21/00; B01D 37/00; A61L 2/08
[52] U.S. Cl. .................. 210/774; 210/750; 210/764; 210/765; 210/766; 210/800; 210/805; 210/168; 210/171; 210/177; 210/188; 210/196; 210/295; 184/6.14; 184/6.24; 184/104.1; 422/26
[58] Field of Search .............. 422/26, 28; 409/137; 219/61.7, 69.14; 184/6.14, 6.24, 6.21, 104.1; 210/739, 749, 750, 764, 765, 766, 774, 800, 805, 167, 168, 171, 172, 177, 180, 188, 196, 198.1, 295

[56] References Cited

U.S. PATENT DOCUMENTS

| | | | |
|---|---|---|---|
| 3,602,128 | 8/1971 | Lindkvist | 454/64 |
| 3,679,051 | 7/1972 | Larson et al. | 210/788 |
| 3,897,335 | 7/1975 | Brandt | 210/167 |
| 4,325,663 | 4/1982 | Lee | 210/168 |
| 4,366,069 | 12/1982 | Dudrey et al. | 210/167 |
| 4,521,313 | 6/1985 | Wolde-Michael | 210/776 |
| 4,636,317 | 1/1987 | Lewis | 210/748 |
| 5,158,677 | 10/1992 | Hewitt et al. | 210/805 |

FOREIGN PATENT DOCUMENTS 1492271 10/1969 Germany ............... 422/26

OTHER PUBLICATIONS

Joe H. Wright, "Coolant Pasteurization-A Promising Answer?"; Manufacturing Engineering, Nov. 1984, pp. 83-84.

*Primary Examiner*—Robert A. Dawson
*Assistant Examiner*—Robert James Popovics

[57] ABSTRACT

A process for the recycling of used and contaminated water-based metalworking fluids comprising separation of solid contaminants by settling and filtration, and separation of unemulsifiable tramp oil, reduction in total dissolved solids, removal of destructive bacteria and fungi, and removal of odors and toxic gases by the injection of steam, said process not requiring the use of a centrifuge.

8 Claims, No Drawings

METALWORKING FLUID RECYCLING PROCESS WITH PASTEURIZATION BY DIRECT STEAM INJECTION

This invention relates to the recycling of metalworking fluids. More particularly, it relates to a new process for the recycling of used and contaminated water-based metalworking fluids, including marginally stable emulsions, without the use of a centrifuge.

BACKGROUND OF THE INVENTION

The machining of metal—drilling, milling, turning, grinding, and the like—is conventionally carried out with the aid of a metalworking fluid. This fluid is directed as a stream, spray, or mist against the point where the machining is taking place, providing cooling, lubrication, and cleaning of the machine tool and the piece of metal being machined ("the workpiece") while also affording rust and corrosion protection to susceptible metal surfaces. Whereas some machining is still carried out with the aid of oil-based metalworking fluids, the preponderance is done with water-based fluids, of which there are three major types:

- soluble oils (emulsifiable oils)—petroleum oils containing emulsifying agents which disperse readily in water, forming milky oil-in-water emulsions;
- synthetics (chemical solutions)—concentrated water solutions of lubricating agents, corrosion inhibitors, and other additives;
- semisynthetics (microemulsions)—concentrated water solutions of emulsifying agents containing small amounts of highly dispersed petroleum oil.

These fluids are supplied as concentrates which are then diluted with water, usually to from 2 to 10% concentration, before being charged to the machines.

Once in use, metalworking fluids rapidly pick up contaminants as they circulate through the machines. These contaminants gradually build up in the fluid and interfere with fluid performance to the degree that the fluid must eventually be changed out of the machine. The major contaminants are the following:

- metal chips, metal fines, and debris from the machining operation;
- hydraulic fluids and petroleum-based lubricating oils leaking from the machine and finding their way into the metalworking fluid ("tramp oil");
- dissolved minerals and salts which build up in the metalworking fluid ("total dissolved solids" or "TDS");
- microorganisms (bacteria and fungi).

Of these, bacteria and fungi are by far the most destructive. Common bacteria such as pseudomonas and desulfovibrio and common fungi such as Candida and Fusarium can thrive in water-based metalworking fluids, consuming essential fluid additives and creating slime, sediment, corrosive by-products, and offensive and toxic odors. Traditionally, the most common reason for changing a metalworking fluid out of a machine has been the rancidity caused by bacteria and fungi.

FIELD OF THE INVENTION

The machining industry once discarded millions of gallons of used and contaminated metalworking fluid each year. Most of this waste was hauled away and dumped. Concern over the buildup of discarded chemical wastes in the environment has led to intense regulatory pressure on all industries to reduce waste hauling and dumping. As a result, recycling of water-based metalworking fluids has become an attractive alternative. Packaged recycling units have appeared in the marketplace for plants that wish to recycle their own fluids. Mobile recycling services are available which bring recycling equipment into a plant on a regular schedule to recycle used fluid that has accumulated since their last visit. Several patents on recycling processes have been issued: for example, Lee, U.S. Pat. No. 4,325,663; Dudrey et al, U.S. Pat. No. 4,366,069; Wolde-Michael, U.S. Pat. No. 4,521,313; Larson et al, U.S. Pat. No. 3,679,051; Lewis, U.S. Pat. No. 4,636,317. All of these patents teach some use of a centrifuge to separate tramp oil and solid contaminants from the fluid being processed. Lewis, for example, employs a continuous disc bowl centrifuge operating at from 8000 rpm to 14000 rpm. Most packaged recycling units and mobile recycling services also make use of a centrifuge in their processes. In general, the recycling of used metalworking fluids has been successful. It has reduced the volumes of waste fluid which would otherwise have been hauled and dumped. It has also reduced the purchases of fresh fluid concentrates which would have been needed to replace the recycled fluid had it been discarded.

However the use of a centrifuge can cause problems in the recycling of certain types of water-based metalworking fluids. When freshly prepared, most soluble oil emulsions and semisynthetic microemulsions are sufficiently stable that they can withstand the high-gravity forces within a centrifuge that tend to pull oil and water apart. However this may no longer be true once the fluid has seen extensive use. The buildup in a fluid of total dissolved solids (TDS) can adversely affect the stability of a metalworking fluid emulsion. Oil droplets in an emulsion are kept apart, in part, by the repulsive effect of like electrical charges on the surface of each drop. An increase in TDS means an increase in the electrical conductivity of the fluid, which tends to counteract the effect of these surface charges and makes it easier for the oil droplets to come together and coalesce. When emulsions with too high a TDS are subjected to the g-forces of a centrifuge, the emulsion may be partially or completely split into separate oil and water phases. Whereas it is sometimes possible to 'rebuild' the emulsion by adding fresh soluble oil concentrate to the water, the water still contains the TDS, which cannot be removed by centrifugation, and the resulting rebuilt emulsion may be too unstable for use.

Bacteria can exert a highly damaging effect on the stability of a metalworking fluid emulsion. Bacteria can consume emulsifying agents, increase the TDS level in the fluid, and lower fluid pH—all factors which tend to create unstable emulsions which fall apart in the centrifuge. Some recycling processes make use of pasteurization—controlled heating—to destroy harmful bacteria and fungi in a contaminated metalworking fluid. In pasteurization, the fluid is passed through a heater to raise its temperature to from about 160° to 200° F. This is sufficient to kill most of the microorganisms which infect metalworking fluids. However pasteurization cannot repair the damage already done to the stability of an emulsion; and a heated emulsion is more likely to split apart in a centrifuge than one at ordinary temperatures.

Finally there are soluble oils which are meant to form relatively unstable emulsions which separate even on standing. Often these products are designed for metalworking operations such as rolling, stamping, and forming wherein the strain on the metal is severe and it is desirable to have a layer of free unemulsified oil on top of the fluid emulsion to "plate out" on the metal surface for maximum lubrication. Attempts to recycle such emulsions using a centrifuge will usually lead to splitting of the emulsion.

Some synthetic fluid formulations make use of inverse solubility lubricant additives—additives which dissolve better in cold water than in hot water and tend to separate from the solution wherever there is heat. In actual use this is an advantage, inasmuch as the most heat in a machining operation will occur where the tool contacts the 'workpiece', and it is desirable to have the lubricating agent concentrated at that point. In a recycling process where the used fluid is first heated and then centrifuged, the g-forces in the centrifuge will tend to remove the inverse solubility additive from the fluid.

In summary, whereas prior art recycling processes using centrifuges have generally been successful, the need exists for a recycling process which can reduce or remove contaminants such as solids, bacteria, fungi, tramp oil, and TDS, but does not rely on centrifugation, and can be used on emulsion-type fluids having marginal emulsion stability and on synthetic fluids having inverse solubility additives. I have now discovered such a process.

DESCRIPTION OF THE INVENTION

The process of my invention comprises the following steps:
1) Collecting used and contaminated water-based metalworking fluid in a used fluid storage and settling tank;
2) Allowing the fluid to sit undisturbed in order to allow solid contaminants to settle to the bottom; and/or
3) Passing the used fluid from the storage tank through supplemental filters to remove solid contaminants therefrom;
4) Passing the fluid into a mixing tank and injecting low pressure steam beneath the surface of the liquid in order to create mild agitation within said fluid and to raise its temperature to pasteurization temperature;
5) Skimming or otherwise drawing off separated oil from the top of the pasteurized fluid in the mixing tank;
6) Passing the pasteurized fluid through a heat exchanger to cool it back to ambient temperature; and finally
7) Transferring the fluid to a clean fluid storage tank, thereby obtaining clean recycled fluid suitable for re-use in a machining operation.

My process will now be described in more detail.

DETAILED DESCRIPTION AND EXAMPLES

The process of my invention may be carried out on all three types of water-based metalworking fluid—soluble oil emulsions, synthetics, and semisynthetics. One of the advantages of my process is the relative simplicity of the equipment required—most of it will already be on hand or easily obtainable at most manufacturing operations. The tanks may be of any convenient shape and material of construction, including lined and unlined steel and rigid polyethylene or similar plastic. The plastic tanks have the advantage that it is often possible to see the shadow of the fluid level through them; moreover, they are light in weight and can easily be transported from one area of a plant to another. A wide variety of pumps, piping, and hoses may be used to transfer the fluid from one stage of the process to the next. Compatibility with water containing some oil is the only requirement. Steam may be obtained from a regular plant boiler or from a steam generator, such as is used in steam cleaning processes. A wide variety of industrial filters are available for removing solid contaminants from the used fluid, including filter bags, wire mesh screens, replaceable cartridge filters, and the like. Compatibility with water-oil mixtures is the main limitation. The removal of separated tramp oil from the top of the water-based fluid may be carried out by a variety of skimming devices such as mechanical skimmers, vacuum skimmers, oil-absorbing cloths, and the like. Alternately, the water-based fluid may be withdrawn from beneath the surface of the separated oil by a suction line, or simply by draining the water-based fluid from the bottom of the tank till the layer of oil appears, and then diverting the oil to a waste-oil storage vessel—a tank, drum, or other suitable container. Cooling of the fluid is carried out by a heat exchanger. Heat exchangers are devices wherein two fluids at different temperatures pass each other on opposite sides of a heat-conductive barrier, thereby transferring heat from the hotter to the cooler fluid while preventing them from mixing one with the other. A wide variety of heat exchangers are available in the market. The cooling liquid used in my process may be cold water or refrigerated water-glycol; or even a stream of cool air may be used, as in an ordinary automotive radiator, to cool the pasteurized fluid as it comes from the mixing tank. It is common practice in industry to use the same fluid in both sides of a heat exchanger. For example, in my process, used fluid from the filters may be passed through the cool side of a heat exchanger and then into the mixing tank to be injected with steam. After the pasteurization and oil-removal steps have been completed, the hot fluid is sent back through the hot side of the exchanger, where it transfers its heat to more used fluid coming from the filters. In this way, much of the heat introduced into the fluid by the steam injection can be recovered, and the overall energy efficiency of the process is increased.

It is believed that the selection of the equipment needed to carry out the recycling process of my invention is well within the skill of an ordinary worker. This relative simplicity is in contrast to some prior art processes which require fairly sophisticated apparatus to carry out. Historically, many companies who purchased their own recycling equipment and attempted to recycle their used metalworking fluids discovered that the equipment was complicated and required considerable time for plant personnel to learn and maintain. As a result, in-house recycling was actually discontinued by many companies, who elected instead to hire a mobile recycling service or to discontinue recycling entirely and return to hauling and dumping. My process, on the other hand, utilizes simple plant equipment and is relatively simple to carry out, and should therefore be easier for plant personnel to master.

In regard to the individual steps of my process:

The size of the tanks and the associated pumps, piping, valving, and other equipment used in my process can most easily be decided on the basis of the volumes of used metalworking fluid generated by the plant. A small machine shop may generate a few hundred gallons of used fluid over months of operation. A large manufacturing facility, on the other hand may generate as much as forty thousand gallons a month. A convenient size for the used fluid storage and settling tank is from 250 to 2000 gallons. It is envisioned that the solid contamination in the used fluid may be removed by settling, or by passage through appropriately sized filters, or both. Some machining operations generate a large amount of solid contamination which builds up in the fluid. In recycling such fluids, it may be preferable to allow the used fluid to sit undisturbed in the used fluid storage tank for a certain period—a few hours to a few days—to allow the bulk of the solids to settle to the bottom of the tank from which they can be removed at the recycler's convenience once the tank is empty and purged of any fumes. On the other hand, some used fluids contain solids too fine to be removed by gravity settling, and must be passed through filters to be cleaned. In some cases, both settling and filtration will be desirable for maximum solids removal.

Once the fluid has been largely cleaned of solid contaminants, it is transferred to the mixing tank for the introduction of steam. Any source of reasonably clean steam may be used. It is preferable that the steam be introduced beneath the surface of the used fluid at a relatively low steam pressure—from one to 5 psig is satisfactory. Introduction of high pressure steam into a cold fluid can be excessively vigorous. In my process, gentle agitation of the used fluid by the steam is desired. The steam injection is key to the success of my process and performs several different functions:

1) It raises the temperature of the fluid to pasteurization temperature (160°-200° F.) to destroy bacteria and fungi;
2) It provides gentle mixing to the fluid to keep relatively unstable emulsions and the like from separating;
3) It provides a lifting action to carry droplets of tramp oil to the surface of the fluid for eventual removal;
4) It partially condenses in the fluid as distilled water which lowers the level of total dissolved solids (TDS) and thereby enhances emulsion stability;
5) It helps strip volatile and malodorous impurities created by the action of bacteria and fungi, such as hydrogen sulfide, from the fluid. It is a preferred embodiment of my invention to mount an exhaust fan or other fume removal means at the top of the mixing tank to carry off and capture objectionable fumes.

It should be noted that the condensation of steam in the form of distilled water within the used fluid will increase its volume from about 5 to 20%. Thus it is preferable though not essential that the mixing tank and the clean fluid storage tank have a correspondingly increased capacity relative to the used fluid storage tank.

It should also be noted that certain plastic tanks have temperature limitations. Polyethylene tanks, for example, begin to lose some of their structural strength above 160° F. If it is desired to use a mixing tank of polyethylene, care must be taken that fluid temperatures do not exceed 160° F. and that raw steam (at 212° F. or above) does not impinge directly on a plastic surface. A temperature of 160° F. is normally sufficient for the pasteurization of used metalworking fluids provided that the fluid remains at that temperature for at least five minutes.

Removal of separated tramp oil from the top of the pasteurized fluid can be carried out by any convenient means, as already noted above. The pasteurized and cleaned fluid is then cooled to ambient temperature by the heat exchanger and transferred to the clean fluid storage tank. Whereas this recycled fluid may be satisfactory for re-use in the machining process for which it was originally intended, it is common practice to analyze said fluid and adjust its concentration, if necessary, to that recommended by the fluid manufacturer for said machining process. It is also common practice to add to the recycled fluid an effective dose of a biocide such as tris(hydroxyethyl)-s-hexahydrotriazine (sold under the trade name Grotan). Pasteurization in the mixing tank will have removed most of the destructive microorganisms from the recycled fluid itself. However pasteurization cannot impart any residual protection to the fluid. The addition of biocide will help protect the recycled fluid from re-infection by bacteria and fungi remaining in the sumps and lines of the machines from which the used fluid was originally changed out.

Whereas the process of my invention has heretofor been described as a series of batch-type operations, it is capable of being adapted to a continuous flow operation. In a continuous version of my process, used and contaminated metalworking fluid is pumped from the used fluid storage tank through the filters to remove solid contaminants and through the cool side of the heat exchanger. It is then introduced into the bottom of the mixing tank and injected with steam as in the batch type process. Once it has nearly filled the mixing tank, it is continuously drawn off by means of a hose or a side draw on the tank from beneath the accumulating layer of tramp oil at such a rate as to keep the volume in the mixing tank constant. The pasteurized fluid then passes through the hot side of the heat exchanger and into the clean fluid storage tank. Once the majority of the used fluid has passed through the system, the accumulated tramp oil can be removed from the top of the mixing tank as before.

The process of my invention will now be illustrated by Examples.

EXAMPLES

The following apparatus was assembled:
A cylindrical vessel for the collection and settling of used metalworking fluid;
A paper filter unit for supplemental solids filtration;
A mixing chamber consisting of an open cylindrical tank with an exhaust fan mounted overhead for removal of fumes;
A gas-fired steam generator capable of supplying steam at 1–5 psig into the mixing chamber through a line inserted below the surface of the used fluid;
A mechanical skimmer for removal of separated tramp oil;
A heat exchanger using cold water as the cooling liquid;
A clean fluid storage vessel.

The used fluid samples used in these Examples were rancid and unstable soluble oil emulsions taken from actual machining operations. Bacteria and fungi counts in the fluids were estimated by means of Difco Hy-Check contact slides. The pH and total dissolved solids (TDS) of the fluids were determined by a pH pen and TDS pen respectively from Hanna Instruments.

Example 1.

The used fluid was a soluble oil used as a 7% emulsion in deionized water. It had a pH of 8.1, a TDS of 1200, and a bacteria count of 10$^7$ (ten million) viable cells per milliliter. No fungi were found. The used fluid had a rancid sulfurous odor and was beginning to exhibit emulsion splitting, with free oil breaking out on top.

This used fluid was settled free of black solid fines, and thirty parts thereof were charged to the mixing tank at an initial temperature of 84° F. Steam was injected beneath the surface at a rate sufficient to keep the liquid gently agitated. The temperature of the liquid rose to 160° F. in four minutes. Seventy parts more of used fluid were charged over a period of eight minutes, with steam injected at a rate sufficient to maintain the fluid temperature at 160° F. When addition of used fluid was complete, steam was continued for an additional six minutes and then discontinued, and the tramp oil accumulated on top of the mixing chamber was skimmed off. The resulting clean fluid was cooled to 86° F. It had a pH of 8.4, a TDS of 1100, and a bacteria count less than 10$^3$ viable cells per milliliter. It had an inocuous oily odor. One hundred and ten parts of this fluid was obtained (a 10% increase). The emulsion still exhibited slight signs of instability but was noticeably better than the original used fluid prior to processing, and would have been satisfactory for its intended use if returned to the machining operation from which it was taken.

Example 2.

A different soluble oil emulsion having a pH of 7.9, a TDS of 1100, and a bacteria count of 10$^7$ viable cells per milliliter was settled free of solid contaminants and treated with steam for ten minutes at 160°–180° F. Separated tramp oil was skimmed off and the resulting fluid cooled back to ambient temperature, It now had a pH of 8.2, a TDS of 900, and no bacteria. The increase in volume from steam condensation was 15%. The recycled fluid was noticeably improved in emulsion stability in comparison to the same fluid prior to recycling.

Example 3.

This soluble oil emulsion had been badly degraded by bacteria. It had a gray color, with black oil separating on top, and a strong odor of hydrogen sulfide. It had a pH of 7.5, a TDS of 1000, and a bacteria count of 10$^6$ viable cells per milliliter. It was settled free of solid and injected with steam for eight minutes at 160° F. The hydrogen sulfide was removed and the recycled fluid had a mild petroleum odor. Interestingly, even the gray color, characteristic of hydrogen sulfide-containing fluids, had lightened to a pale beige. The recycled fluid had a pH of 8.1, a TDS still at 1000, and no bacteria. This particular recycled fluid would have needed rebuilding by addition of soluble oil concentrate in order to restore it to a proper condition for re-use, but overall the recycling was considered to be successful.

The preceding Examples are by way of illustration only and are not meant to be limiting within the scope of the following claims:

I claim:

1. A process for recycling water-based metal working fluids, said process employing the following equipment:
   a used fluid storage tank to store and allow for gravity settling of solid contaminants in a collected, used, water-based fluid to be recycled;
   filtration means to further remove solid contaminants from said collected fluid to be recycled;
   a mixing tank for receipt of said fluid to be recycled after it has passed through said used fluid storage tank and said filtration means, said mixing tank containing steam injection means for the introduction of low pressure steam beneath the surface of said fluid to be recycled contained within said mixing tank, said mixing tank additionally containing tramp oil removal means for the removal of tramp oil lifted to the top of said fluid to be recycled;
   heat exchanger means for cooling said fluid to be recycled to ambient temperature after steam has been injected and tramp oil has been removed from said fluid, said fluid to be recycled and a cooling fluid passing each other on opposite sides of a heat-conducting barrier, thereby transferring heat from said fluid to be recycled to said cooling fluid while preventing intermixing thereof;
   a recycled fluid storage tank for receipt and storage of said fluid to be recycled after it has been cooled by said heat exchanger means; and
   fluid transfer means for transferring said fluid to be recycled from one process step to the next; said recycling process comprising the following steps:
   collecting used water-based metalworking fluid in said used fluid storage tank; then
   removing solid contaminants from said used metalworking fluid by gravity settling in said fluid storage tank; then
   removing solid contaminants from said used metalworking fluid by passage through said filtration means; then
   passing said used fluid into said mixing tank; then
   injecting low pressure steam beneath the surface of said used fluid in order to raise said fluid to pasteurization temperature, to provide gentle mixing to said fluid to keep unstable emulsions and inversely soluble additives from separating, to strip volatile and malodorous impurities from said fluid, to lower the concentration of dissolved solids in said fluid, and to provide lifting action to lift tramp oil to the top of said fluid; then
   removing said tramp oil from said fluid using said tramp oil removal means; then
   passing said fluid through said heat exchanger means to cool said fluid to ambient temperature; and finally
   transferring the resulting fluid into said recycled fluid storage tank, thereby obtaining recycled water-based metalworking fluid.

2. The recycling process of claim 1 wherein fume removal means are mounted at the top of said mixing tank to carry off objectionable fumes.

3. The process of claim 1 wherein the used fluid is a soluble oil emulsion.

4. The process of claim 1 wherein the used fluid is a semisynthetic microemulsion.

5. The process of claim 1 wherein the used fluid is a synthetic.

6. The process for recycling water-based metal working fluids of claim 1, wherein the tramp oil removal means is selected from the group consisting of mechanical skimmers, vacuum skimmers and oil-absorbing cloths.

7. The process for recycling water-based metal working fluids of claim 1, further comprising the step of withdrawing water-based fluid from beneath the accumulating tramp oil using suction lines and drain lines.

8. The process for recycling water-based metal working fluids of claim 1, wherein the fluid to be recycled, after the filtration step, and before entering the mixing tank, is used as the cooling fluid.

* * * * *